US010089870B2

(12) United States Patent
Ro

(10) Patent No.: US 10,089,870 B2
(45) Date of Patent: Oct. 2, 2018

(54) TRAFFIC SIGNS RECOGNITION DEVICE AND SPEED LIMIT PROVIDING METHOD THEREOF

(71) Applicant: MANDO CORPORATION, Pyeongtaek-si, Gyeonggi-do (KR)

(72) Inventor: Dai Chang Ro, Seongnam-si (KR)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 0 days.

(21) Appl. No.: 15/355,948

(22) Filed: Nov. 18, 2016

(65) Prior Publication Data
US 2017/0148320 A1 May 25, 2017

(30) Foreign Application Priority Data
Nov. 19, 2015 (KR) .................. 10-2015-0162468

(51) Int. Cl.
*G08G 1/0967* (2006.01)
*G06K 9/00* (2006.01)

(52) U.S. Cl.
CPC ....... *G08G 1/0967* (2013.01); *G06K 9/00818* (2013.01)

(58) Field of Classification Search
CPC .................. G08G 1/0967; G06K 9/00818
See application file for complete search history.

(56) References Cited

U.S. PATENT DOCUMENTS

| 5,844,505 A * | 12/1998 | Van Ryzin ......... G01C 21/3602 340/905 |
| 2010/0198488 A1* | 8/2010 | Groitzsch ............. G01C 21/26 701/117 |
| 2016/0117922 A1* | 4/2016 | Oh ..................... G08G 1/09623 348/118 |

FOREIGN PATENT DOCUMENTS

| KR | 10-1999-0003356 A | 1/1999 |
| KR | 10-2010-0004022 A | 1/2010 |

* cited by examiner

*Primary Examiner* — Brian Wilson
(74) *Attorney, Agent, or Firm* — Hauptman Ham, LLP

(57) ABSTRACT

Disclosed herein is a TSR (Traffic Sign Recognition) device which acquires information on a traffic sign positioned on a road through a camera and recognizes and outputs the speed limit of the acquired traffic sign information. The TSR device may include a navigation terminal and an electronic control unit. The navigation terminal may create and display a driving path of a vehicle. The electronic control unit may provide a speed limit updated from the navigation terminal, when a road attribute contained in the road information is changed or the sign information is indication information indicating a speed limit change, based on road information on the driving path and the sign information acquired through the camera, the road information being received from the navigation terminal while the vehicle travels along the driving path.

12 Claims, 4 Drawing Sheets

TRAFFIC SIGNS RECOGNITION DEVICE AND SPEED LIMIT PROVIDING METHOD THEREOF

CROSS-REFERENCE(S) TO RELATED APPLICATIONS

This application claims priority to Korean Patent Application No. 10-2015-0162468, filed on Nov. 19, 2015, the disclosure of which is incorporated herein by reference in its entirety.

BACKGROUND OF THE INVENTION

Field of the Invention

Exemplary embodiments of the present invention relate to a TSR (Traffic Signs Recognition) device and a speed limit providing method thereof, and more particularly, to a TSR device and a speed limit providing method thereof, which are capable of providing a speed limit suitable for a driving environment, based on road information provided from a navigation terminal and sign information acquired through a camera.

Description of the Related Art

A TSR device recognizes general and electronic traffic signs through a front-view camera and displays the recognized information on a cluster, during operation of a vehicle. Thus, the TSR device can warn a driver by providing the speed limit information of the road where the vehicle is traveling, thereby preventing a traffic accident by overspeed.

The TSR device is likely to cause a malfunction in an environment where traffic signs on the road are covered by other vehicles or not recognized due to a bad weather, even though the traffic signs maintain a relatively normal state because they are less likely to be damaged than lanes on the road, due to the positions of the traffic signs on the road. For example, the TSR device may not deliver the latest information to the driver.

The environment in which such a malfunction is likely to occur may include a case in which the camera does not recognize a new traffic sign for a predetermined time even though the road attribute was changed after the vehicle passed an expressway entrance, expressway exit or junction, a case in which the camera does not recognize a new traffic sign for a predetermined time after recognizing a sign indicating a change of road attribute before the road attribute is not changed, a case in which the camera does not recognize a new traffic sign while the vehicle travels on an expressway, and a case in which the camera does not recognize a new traffic sign after passing a speed limit release area.

Thus, there is a demand for an enhanced TSR device which reflects information on whether a road diverges, road attribute information, position information and speed limit information, and warns a driver by providing a speed limit according to the environment of the road where a vehicle is traveling.

RELATED ART DOCUMENTS

[Patent Documents]

(Patent Document 1) Korean Patent Laid-open Publication No. 2010-0004022 published on Jan. 12, 2010 and entitled "Navigation device, system and method using road signs".

(Patent Document 2) Korean Patent Laid-open Publication No. 1999-0003356 published on Jan. 15, 1999 and entitled "Vehicle overspeed warning device using GPS and map data and control method thereof".

SUMMARY OF THE INVENTION

The present invention has been made in view of the above problems, and it is an object of the present invention to provide a TSR device and a speed limit providing method thereof, which are capable of providing a speed limit suitable for a driving environment, based on road information provided from a navigation terminal and sign information acquired through a camera.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with one aspect of the present invention, there is provided a TSR device which acquires information on a traffic sign positioned on a road through a camera and recognizes and outputs the speed limit of the acquired traffic sign information. The TSR device may include a navigation terminal and an electronic control unit. The navigation terminal may create and display a driving path of a vehicle. The electronic control unit may provide a speed limit updated from the navigation terminal, when a road attribute contained in the road information is changed or the sign information is indication information indicating a speed limit change, based on road information on the driving path and the sign information acquired through the camera, the road information being received from the navigation terminal while the vehicle travels along the driving path.

In accordance with one aspect of the present invention, there is provided a speed limit providing method of a TSR device which acquires information on a traffic sign positioned on a road through a camera and recognizes and outputs the speed limit of the acquired traffic sign information. The method may include: creating and displaying a driving path of a vehicle; and providing a speed limit updated from a navigation terminal, when a road attribute contained in the road information is changed or the sign information is indication information indicating a speed limit change, based on road information on the driving path and the sign information acquired through the camera, the road information being received from the navigation terminal while the vehicle travels along the driving path.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF SPECIFIC EMBODIMENTS

Hereafter, exemplary embodiments of the present invention will be described in detail with the accompanying drawings.

Figure 1:
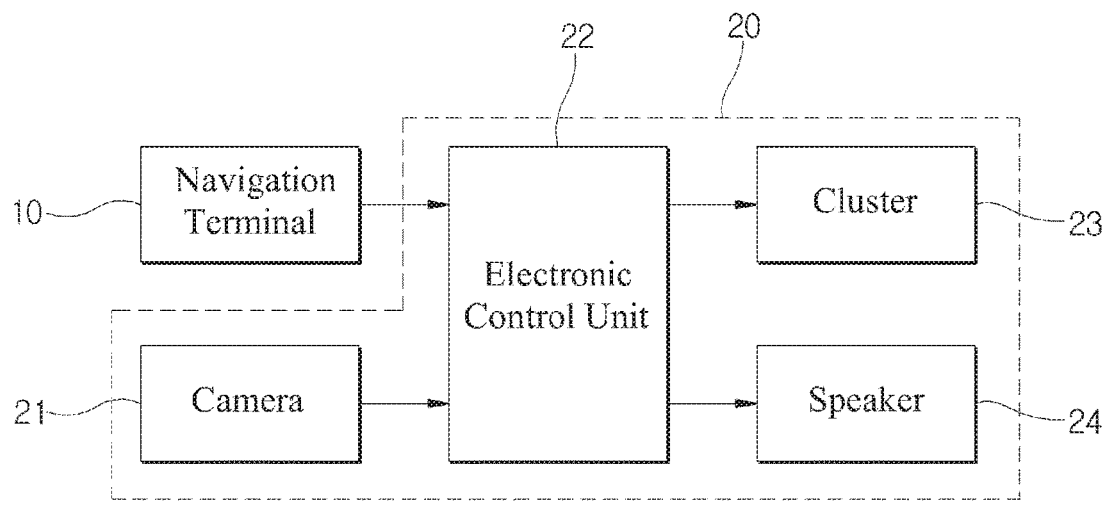
FIG. 1 is a block diagram illustrating a TSR device according to an embodiment of the present invention.
Figure 2:
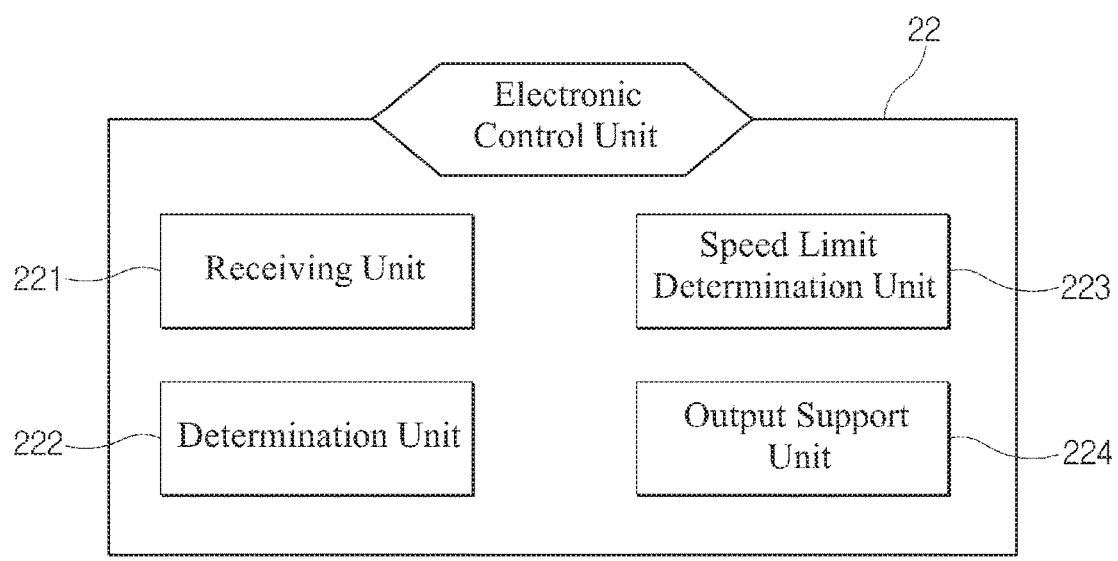
FIG. 2 is a block diagram illustrating an electronic control unit of FIG. 1.

FIG. 1 is a block diagram illustrating a TSR (Traffic Signs Recognition) device according to an embodiment of the present invention, and FIG. 2 is a block diagram illustrating an electronic control unit of FIG. 1.

Referring to FIG. 1, the TSR device 20 according to the embodiment of the present invention may provide a speed limit corresponding to a changed driving road or a road to which a driving road is to be changed, using traffic sign information acquired from a camera 21 and road information received from a navigation terminal 10, when the road attribute is changed or the sign information indicates a speed limit change. The traffic sign may include a road sign on the road and a traffic sign installed at the top of a post fixed at a side of the road and indicating a speed limit.

The TSR device 20 includes the camera 21 and an electronic control unit 22. The camera 21 films the road environment or the front environment in which the vehicle is traveling, and the electronic control unit 22 displays a speed limit corresponding to the traveling environment on a cluster 23 or provides the speed limit through the speaker 50, using sign information acquired from the camera 21 and the road information received from the navigation terminal 10.

In particular, when the road attribute is changed or the sign information indicates a speed limit change including a road attribute change while the vehicle travels along a path created by designating a starting point and a destination through the navigation terminal 10, the electronic control unit 22 decides the speed limit updated from the navigation terminal 10 as the speed limit of the driving road, using the road information provided from the navigation terminal 10 and the sign information acquired through the camera 21 The road information may include road junction information, road attribute information, and position (GPS) and speed limit information, and the sign information may include a speed limit, information of a sign, and a sign position in video.

The navigation terminal 10 stores the speed limit which is matched with the driving road. The speed limit of the driving road, which needs to be changed before the road attribute is changed, is set to the speed limit updated from the navigation terminal 10, based on the indication information.

The electronic control unit 22 includes a receiving unit 221, determination unit 222, a speed limit decision unit 223 and an output support unit 224.

The receiving unit 221 receives sign information acquired from the camera 21. The receiving unit 221 receives road information provided from the navigation terminal 10. The road information may include a road attribute indicating one or more of an expressway entrance, an expressway exit, a junction (JC), an intersection, an expressway changed from a national highway and a national highway changed from an expressway. The receiving unit 221 may receive a heading angle of the vehicle. The receiving unit 221 receives the speed of the vehicle.

The determination unit 222 determines whether the road attribute included in the road information provided from the navigation terminal 10 indicates a change of the driving road through an expressway entrance, expressway exit or junction.

The determination unit 222 may determine whether the received sign information is indication information indicating a speed limit change (for example, indication information indicating a road attribute change). The determination unit 222 may determine whether the received sign information is speed limit release information. The determination unit 222 may determine whether the received sign information is restriction release information. The determination unit 222 may determine whether the received sign information is work-zone information. The determination unit 222 may determine whether the received sign information is information on a driving direction change at an intersection.

The determination unit 222 determines whether the vehicle is traveling at a higher speed by a reference speed or more than the speed limit of the sign information acquired through the camera 21, when the vehicle is traveling on an expressway. The determination unit 222 determines whether the vehicle is traveling at a higher speed by a predetermined speed or more than the speed limit within a predetermined reference distance, after the speed limit is provided. The determination unit 222 determines whether the vehicle is traveling at a higher speed than the maximum reference speed, after traveling at not more than the preset minimum reference speed for a preset reference time.

The speed limit decision unit 223 decides the speed limit of a traffic sign installed on the road as the speed limit of the current driving road, when the road attribute is not changed. Furthermore, the speed limit decision unit 223 decides the speed limit of a traffic sign installed on the road as the speed limit of the current driving road, when a change of the road attribute is not indicated. Furthermore, the speed limit decision unit 223 decides the speed limit of a traffic sign installed on the road as the speed limit of the current driving road, when the above-described condition during high-speed traveling on the expressway is not satisfied.

However, when the road attribute is changed, the speed limit decision unit 223 decides the speed limit updated from the navigation terminal 10 as the speed limit of the current driving road. Furthermore, when a change of the road attribute is indicated, the speed limit decision unit 223 decides the speed limit updated from the navigation terminal 10 as the speed limit of the current driving road. Furthermore, when the above-described condition during high-speed traveling on the expressway is satisfied, the speed limit decision unit 223 decides the speed limit updated from the navigation terminal 10 as the speed limit of the current driving road. The current position (GPS information) of the vehicle is received through a GPS receiver (not illustrated) installed in the navigation terminal 10. The speed limit at each position is stored in a storage unit (not illustrated) of the navigation terminal 10.

When the heading angle of the vehicle is received, the speed limit decision unit 223 determines the direction of the vehicle which goes straight or turns left or right, based on the heading angle of the vehicle, and recognizes a driving road corresponding to the determined direction. The speed limit decision unit 223 decides the speed limit of the recognized driving road. Furthermore, the speed limit decision unit 223 determines the direction of the vehicle which goes straight or turns left or right, according to the heading angle which is determined based on the vehicle information, and recognizes a driving road corresponding to the determined direction. The speed limit decision unit 223 decides the speed limit of the recognized driving road.

In particular, the speed limit decision unit 223 decides the speed limit updated from the navigation terminal 10 as the speed limit in the determined direction. The vehicle information includes values which are measured through various sensors installed in the vehicle during operation of the vehicle.

The output support unit 224 outputs the speed limit decided by the speed limit decision unit 223, using one or more of the cluster 23 and the speaker 24. Thus, a driver can accurately recognize the speed limit of the driving road through the speed limit displayed on the cluster 23, the speed limit outputted through the speaker 24 or a combination thereof.

Figure 3:
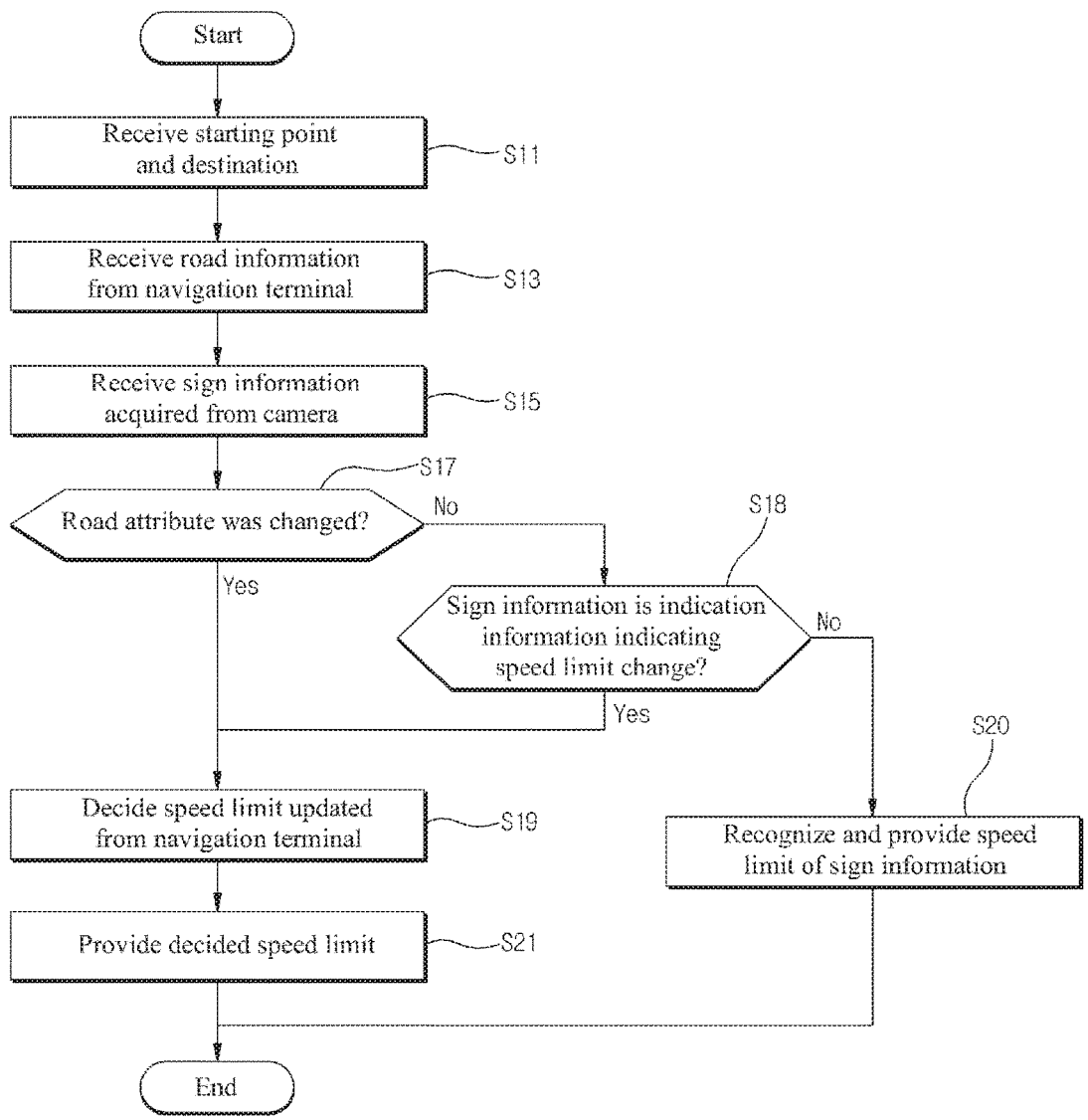
FIG. 3 is a flowchart showing a speed limit providing method of a TSR device according to an embodiment of the present invention.

Referring to FIG. 3, a speed limit providing method of the TSR device having the above-described configuration will be described as follows.

FIG. 3 is a flowchart showing the speed limit providing method of the TSR device according to the embodiment of the present invention.

Referring to FIG. 3, the navigation terminal 10 receives a starting point and a destination at step S11. The navigation terminal 10 creates a driving path based on the received starting point and destination, and displays the driving path on the screen.

The electronic control unit 22 receives road information on the driving path created from the navigation terminal 10 at step S13.

The electronic control unit 22 receives sign information on the driving path, the sign information being acquired from the camera 21, at step S15. At this time, the camera 21 acquires a forward video of the vehicle. The forward video may include a speed limit marked on the road and a speed limit marked on a sign installed around the road as well as the lanes of the road.

The order of steps S13 and S15 does not limit the present invention, as long as steps S13 and 15 are performed before step S17 described later.

The electronic control unit 22 determines whether the road attribute was changed, based on the road information received at step S13, at step S17. That is, the electronic control unit 22 determines whether the road attribute is an expressway entrance, an expressway exit, a junction, an intersection, a national highway changed from an expressway, an expressway changed from a national highway or a work zone.

When it is determined at step S17 that the road attribute was changed, the electronic control unit 22 decides the speed limit updated from the navigation terminal 10 and matched with the driving road as the speed limit of the current driving road, at step S19.

The electronic control unit 22 provides the decided speed limit at step S21. The decided speed limit may be outputted through one or more of the cluster 23 and the speaker 24, and stably provided to a driver, which makes it possible to prevent overspeeding of the vehicle.

When the road attribute is an expressway entrance and the vehicle travels on the expressway through the expressway entrance, the electronic control unit 22 additionally determines whether the vehicle is traveling at a higher speed by a preset reference speed of 70 kph or more, for example, than the speed limit of the sign information acquired through the camera 21. When it is determined that the vehicle is traveling on the expressway at a higher speed by the reference speed or more than the speed limit, the electronic control unit 22 decides the speed limit updated from the navigation terminal 10 and matched with the driving road as the speed limit of the current driving road.

When the vehicle travels on the expressway, the vehicle may not travel at a higher speed by the reference speed of 70 kph or more, for example, than the speed limit. In this case, the electronic control unit 22 determines whether the vehicle travels at a higher speed by a predetermined speed of 25 kph or more than the speed limit of a traffic sign installed on the driving road within a preset reference distance of 1.5 km, for example. When it is determined that the vehicle travels at a higher speed by the predetermined speed or more than the speed limit, the electronic control unit 22 decides the speed limit updated from the navigation terminal 10 and matched with the driving road as the speed limit of the current driving road.

Therefore, when the vehicle travels on an expressway, the electronic control unit 22 can stably provide the speed limit of the driving road updated from the navigation terminal 10, even though the vehicle encounters a road environment in which a sign is damaged, a sign is covered by another vehicle or a bad weather is continued.

Furthermore, when the vehicle is accelerated at a maximum reference speed of 90 kph or more after traveling at a preset minimum reference speed of 10 kph or less for a preset reference time of 3 seconds or more, the electronic control unit 22 determines that the vehicle passed a toll gate, and decides the speed limit updated from the navigation terminal 10 as the speed limit of the driving road after the toll gate.

When it is determined at step S17 that the road attribute was not changed, the electronic control unit 22 determines whether the sign information acquired through the camera 21 is indication information indicating a speed limit change, at step S18.

Figure 4:
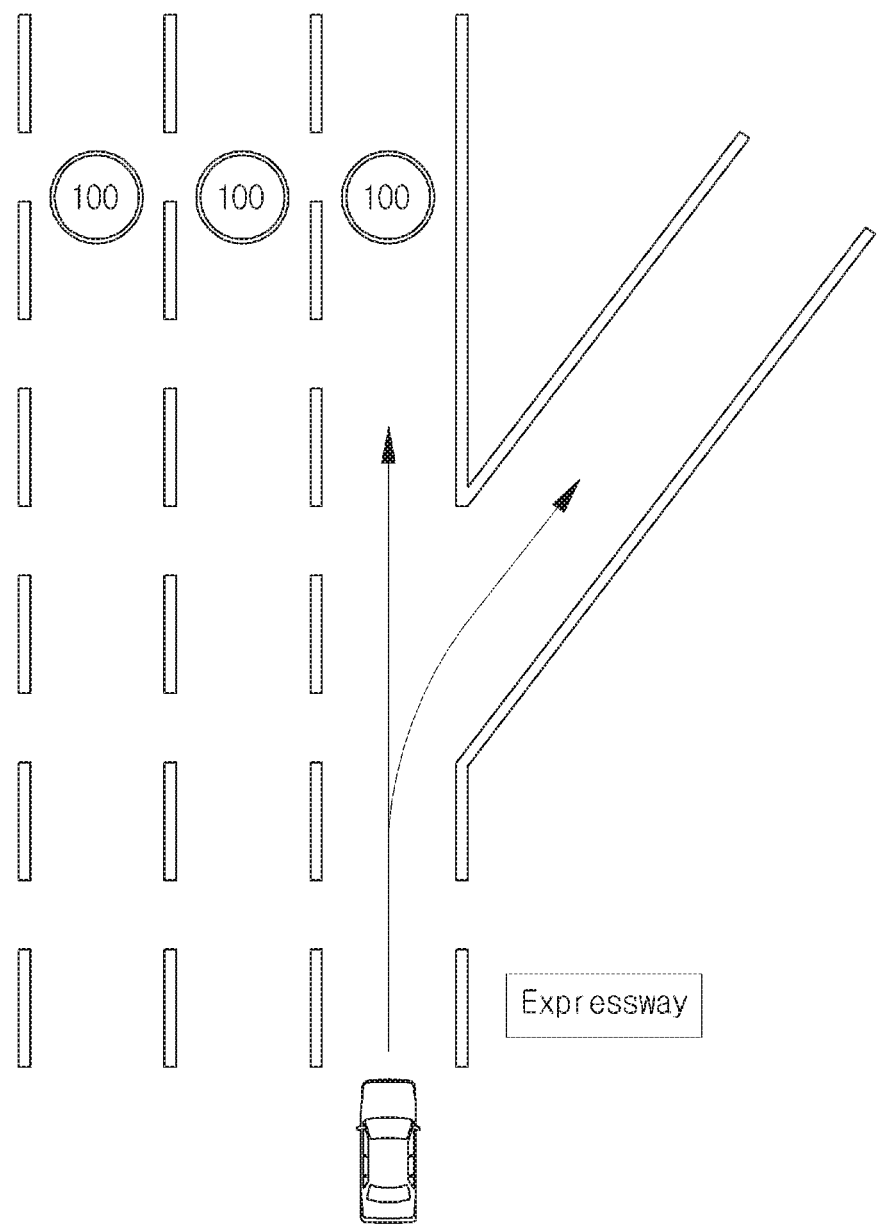
FIG. 4 is a diagram illustrating an example of providing the speed limit of a road, which must be changed before a road attribute is changed.

When it is determined at step S18 that the sign information acquired through the camera 21 is indication information indicating a speed limit change, the electronic control unit 22 proceeds to step S19 to decide the speed limit of the driving road updated from the navigation terminal 10 as the speed limit of the current driving road. As illustrated in FIG. 4, sign information of an expressway sign installed on a driving road can be acquired through the camera 21.

The electronic control unit 22 may recognize that the sign information is indication information (for example, Expressway) indicating that the road attribute is changed.

When the sign information acquired through the camera 21 is recognized as indication information indicating a speed limit change, the electronic control unit 22 decides the speed limit updated from the navigation terminal 10 as the speed limit of the road, which is to be changed. The indication information includes indication information indicating an entry to an expressway, indication information indicating an exit from an expressway, indication information indicating speed limit release, indication information indicating restriction release, and indication information indicating a driving direction. In the case of an intersection, a heading direction is determined, and the speed limit updated from the navigation terminal 10 is decided as the speed limit in the determined heading direction.

When it is determined at step S18 that the sign information acquired through the camera 21 is not indication information indicating a speed limit change, the electronic control unit 22 recognizes the speed limit of the sign information acquired from the camera 21 and provides the recognized speed limit, at step S20.

As described above, the electronic control unit 22 may provide a speed limit according to the speed limit updated from the navigation terminal 10, based on road information and sign information on a driving road, while preventing a malfunction which occurs because a traffic sign is not recognized as in the related art. Through this configuration, a driver can accurately recognize the speed limit corresponding to the driving environment across the entire operation section.

The TSR device and the speed limit providing method thereof according the embodiments of the present invention can determine whether a driving road of a vehicle is a general road or expressway. The TSR device and the speed limit providing method thereof can provide the speed limit update method which is optimized for each of the general road and the expressway. Through this configuration, a driver can accurately recognize the speed limit corresponding to the traveling environment across the entire operation section.

In accordance with the embodiments of the present invention, the TSR device and the speed limit providing method thereof can provide a speed limit corresponding to a driving environment, based on the road information provided from the navigation terminal and the sign information acquired through the camera.

While the present invention has been described with respect to the specific embodiments, it will be apparent to those skilled in the art that various changes and modifications may be made without departing from the spirit and scope of the invention as defined in the following claims.

What is claimed is:

1. A Traffic Sign Recognition (TSR) device which acquires traffic sign information on a traffic sign positioned on a road through a camera, receives road information from a navigation terminal configured to create and display a driving path of a vehicle and outputs a speed limit of the driving path of the vehicle, comprising:
an electronic control unit configured to provide a speed limit updated from the navigation terminal, if the acquired traffic sign information does not provide speed limit information but a road attribute contained in the road information is changed or the acquired traffic sign information is indication information indicating a changing of a speed limit, based on the acquired traffic sign information acquired through the camera and the road information being received from the navigation terminal while the vehicle travels along the driving path,
wherein the electronic control unit
recognizes the speed limit of the acquired traffic sign information when the vehicle travels on an expressway, and
decides the speed limit updated from the navigation terminal as the speed limit of a driving road, when the vehicle is traveling at a higher speed by a predetermined speed or more than the speed limit within a preset reference distance or traveling at a higher speed by a preset reference speed or more than the speed limit of the acquired traffic sign information.

2. The TSR device according to claim 1, wherein the road attribute comprises one or more of an expressway entrance, an expressway exit, a junction (JC), an intersection, a national highway changed from an expressway, an expressway changed from a national highway and a work zone.

3. The TSR device according to claim 2, wherein when the road attribute was changed after the vehicle passed the expressway entrance, the expressway exit or the junction, the electronic control unit decides the speed limit updated from the navigation terminal as the speed limit of a driving road.

4. The TSR device according to claim 1, wherein the indication information comprises one of indication information indicating an entry to an expressway, indication information indicating an exit from an expressway, indication information indicating a speed limit release, indication information indicating a restriction release, indication information indicating a work zone and indication information indicating a driving direction at an intersection.

5. The TSR device according to claim 4, wherein when the indication information indicates the entry to expressway or the exit from the expressway, the electronic control unit decides the speed limit updated from the navigation terminal as the speed limit of the driving road.

6. The TSR device according to claim 4, wherein when the indication information indicates the driving direction at the intersection, the electronic control unit recognizes a first driving road corresponding to a direction of the vehicle that goes straight or turns left or right, according to a heading angle of the vehicle, and decides the speed limit updated from the navigation terminal as the speed limit of the first driving road.

7. The TSR device according to claim 1, wherein when the vehicle is accelerated at a maximum reference speed or more after traveling at a preset minimum reference speed or less for a preset reference time or more when the vehicle travels on an expressway, the electronic control unit determines that the vehicle passes a toll gate, and decides the speed limit updated from the navigation terminal as the speed limit of the driving road after passing the toll gate.

8. A speed limit providing method of a Traffic Sign Recognition (TSR) device which acquires traffic sign information on a traffic sign positioned on a road through a camera, receives road information from a navigation terminal configured to create and display a driving path of a vehicle and outputs a speed limit of the driving path of the vehicle, comprising:
acquiring the traffic sign information on the traffic sign positioned on the road through the camera; and
providing a speed limit updated from the navigation terminal, if the acquired traffic sign information does not provide speed limit information but a road attribute contained in the road information is changed or the acquired traffic sign information is indication information indicating a changing of a speed limit, based on the acquired traffic sign information acquired through the camera and the road information,
wherein the providing of the updated speed limit comprises recognizing the speed limit of the acquired traffic sign information acquired through the camera when the vehicle travels on an expressway, and deciding the speed limit updated from the navigation terminal as the speed limit of a driving road, when the vehicle is traveling at a higher speed by a predetermined speed or more than the speed limit within a preset reference distance or traveling at a higher speed by a preset reference speed or more than the speed limit of the acquired traffic sign information acquired through the camera.

9. The speed limit providing method according to claim 8, wherein the providing of the updated speed limit comprises:
determining whether the road attribute contained in the road information received from the navigation terminal indicates that a driving road was changed after the vehicle passed an expressway entrance, expressway exit or junction; and deciding the speed limit updated from the navigation terminal as the speed limit of the changed driving road, when the driving road was changed.

10. The speed limit providing method according to claim 8, wherein the providing of the updated speed limit comprises:
determining whether the acquired traffic sign information is indication information indicating an entry to an expressway or an exit to an expressway; and
deciding the speed limit updated from the navigation terminal as the speed limit of the driving road, when the acquired traffic sign information is indication information indicating the entry to the expressway or the exit to the expressway.

11. The speed limit providing method according to claim 8, wherein the providing of the updated speed limit comprises:
determining a direction of the vehicle that goes straight or turns left or right according to a heading angle of the vehicle, when the acquired traffic sign information is indication information indicating a driving direction at an intersection; and deciding the speed limit updated from the navigation terminal as the speed limit of a driving road corresponding to the determined direction.

12. The speed limit providing method according to claim 8, wherein the providing of the updated speed limit comprises:
determining whether the vehicle was accelerated at a maximum reference speed or more after traveling at a preset minimum reference speed or less for a preset reference time or more, when the vehicle travels on an expressway; and
determining that the vehicle passes a toll gate, when it is determined that the vehicle was accelerated at the maximum reference speed or more after traveling at the preset minimum reference speed or less for the preset reference time or more, and deciding the speed limit updated from the navigation terminal as the speed limit of a driving road after passing the toll gate.

* * * * *